US010520082B2

United States Patent
Kawamoto et al.

(10) Patent No.: US 10,520,082 B2
(45) Date of Patent: Dec. 31, 2019

(54) DEVICE AND METHOD FOR HYDRAULICALLY CONTROLLING CONTINUOUSLY VARIABLE TRANSMISSION FOR VEHICLE

(71) Applicants: JATCO Ltd, Fuji-shi, Shizuoka (JP); NISSAN MOTOR CO., LTD., Yokohama-shi, Kanagawa (JP)

(72) Inventors: Yoshinobu Kawamoto, Seoul (KR); Hiroyasu Tanaka, Atsugi (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 120 days.

(21) Appl. No.: 15/757,093

(22) PCT Filed: Sep. 6, 2016

(86) PCT No.: PCT/JP2016/076067
§ 371 (c)(1),
(2) Date: Mar. 2, 2018

(87) PCT Pub. No.: WO2017/043459
PCT Pub. Date: Mar. 16, 2017

(65) Prior Publication Data
US 2018/0180179 A1 Jun. 28, 2018

(30) Foreign Application Priority Data

Sep. 9, 2015 (JP) .................................. 2015-177962

(51) Int. Cl.
*B60W 10/107* (2012.01)
*F16H 61/70* (2006.01)
(Continued)

(52) U.S. Cl.
CPC ....... *F16H 61/702* (2013.01); *F16H 61/0021* (2013.01); *B60W 10/107* (2013.01);
(Continued)

(58) Field of Classification Search
CPC .......... Y10T 477/6217; Y10T 477/624; Y10T 477/6243; B60W 10/107; B60W 10/11;
(Continued)

(56) References Cited

U.S. PATENT DOCUMENTS 7,922,610 B2 * 4/2011 Nihei .................. F16H 61/0021
474/18
9,939,063 B2 * 4/2018 Honma ............... F16H 61/0021
(Continued)

FOREIGN PATENT DOCUMENTS

| JP | 2002-021994 A | 1/2002 |
| JP | 2007-187203 A | 7/2007 |
| WO | WO-2014-042032 A1 | 3/2014 |

Primary Examiner — Roger L Pang
(74) Attorney, Agent, or Firm — Foley & Lardner LLP

(57) ABSTRACT

A hydraulic pressure control device for a continuously variable transmission of a vehicle which a continuously variable transmission mechanism; a stepwise variable transmission mechanism; a shift control means, the hydraulic pressure control device includes: the shift control means including a line pressure control section configured to increase the line pressure to be greater than the line pressure before a generation of an oil vibration when the oil vibration is generated in at least one of actual hydraulic pressures of the primary pressure and the secondary pressure, and the line pressure control section being configured to continue the increase of the line pressure until the shift of the stepwise variable transmission mechanism is finished when the stepwise variable transmission is shifted in a state where the line pressure is increased.

6 Claims, 8 Drawing Sheets

(51) Int. Cl.
*F16H 61/00* (2006.01)
*F16H 9/26* (2006.01)
*B60W 30/20* (2006.01)
*B60W 10/11* (2012.01)
*B60W 30/19* (2012.01)
*F16H 61/662* (2006.01)
*F16H 3/66* (2006.01)
*F16H 9/18* (2006.01)
*F16H 37/02* (2006.01)

(52) U.S. Cl.
CPC .............. *B60W 10/11* (2013.01); *B60W 30/19* (2013.01); *B60W 2030/203* (2013.01); *B60W 2510/1025* (2013.01); *F16H 3/663* (2013.01); *F16H 9/18* (2013.01); *F16H 9/26* (2013.01); *F16H 37/022* (2013.01); *F16H 61/662* (2013.01); *F16H 2037/023* (2013.01); *F16H 2037/026* (2013.01); *F16H 2200/0034* (2013.01); *F16H 2200/2007* (2013.01); *F16H 2200/2038* (2013.01); *Y10T 477/624* (2015.01); *Y10T 477/6217* (2015.01); *Y10T 477/6243* (2015.01)

(58) Field of Classification Search
CPC ........... B60W 30/19; B60W 2030/203; B60W 2510/1025; F16H 9/26; F16H 61/702; F16H 61/0021; F16H 9/18; F16H 37/022; F16H 2037/023; F16H 61/662
USPC ............................. 475/208, 209; 701/60, 66
See application file for complete search history.

(56) References Cited

U.S. PATENT DOCUMENTS 10,228,055 B2\* 3/2019 Suwabe .................. F16H 61/12
2018/0180178 A1\* 6/2018 Inoue .................... F16H 61/662

\* cited by examiner

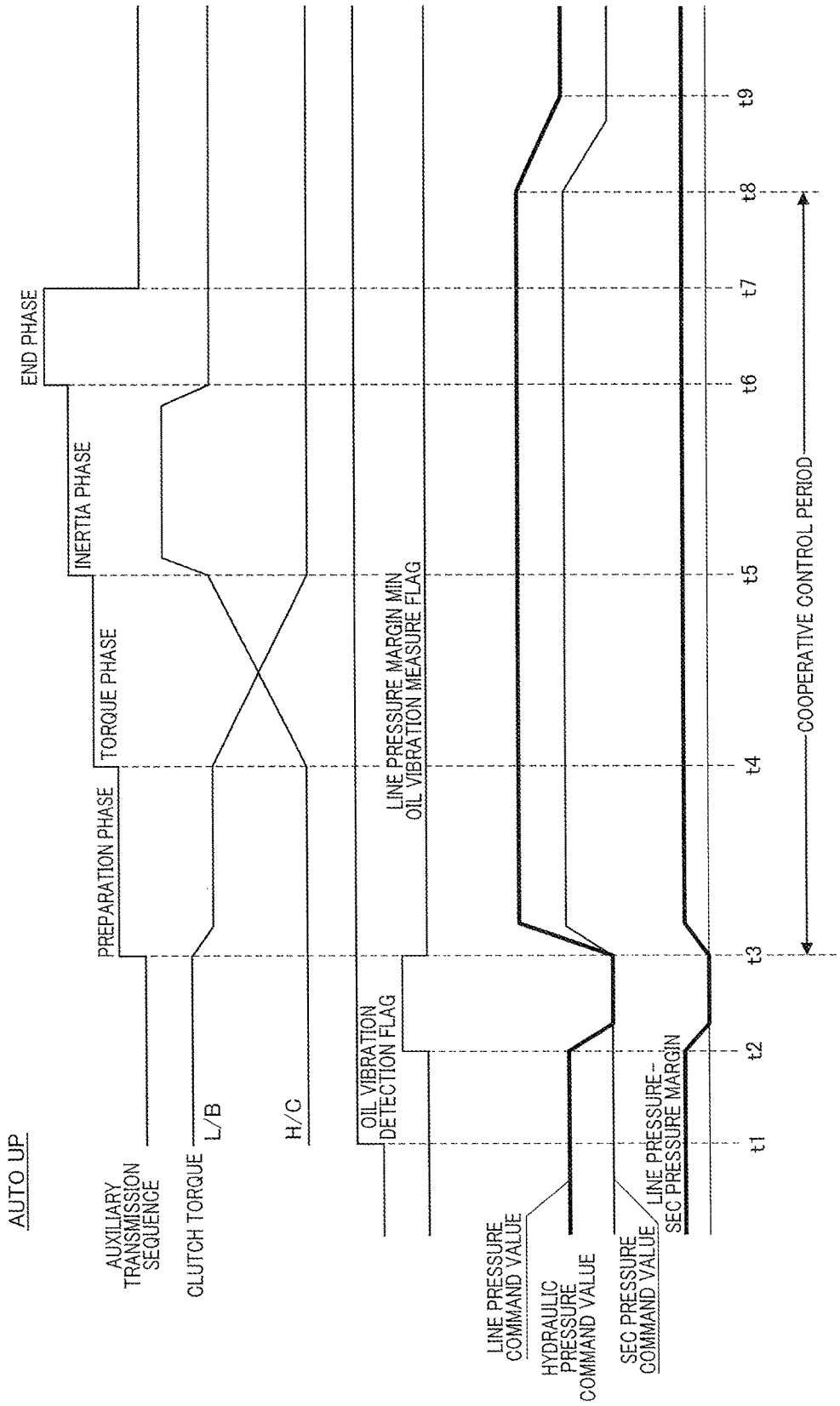

DEVICE AND METHOD FOR HYDRAULICALLY CONTROLLING CONTINUOUSLY VARIABLE TRANSMISSION FOR VEHICLE

TECHNICAL FIELD

This invention relates to a hydraulic control device and a hydraulic control method for a continuously variable transmission of a vehicle which includes a stepwise variable transmission mechanism, and in which a shift hydraulic pressure control is both pressure regulating type.

BACKGROUND ART

Conventionally, there is known a hydraulic pressure control device for an automatic transmission which is a continuously variable transmission is a single pressure regulation (a line pressure=a secondary pressure), and which is configured to perform an oil vibration countermeasure to vary a feedback amount of a feedback control when an oil vibration is generated (for example, a patent document).

Recently, there is a continuously variable transmission which is a both pressure regulating type (including pressure regulating valves arranged to regulate, respectively, a primary pressure and a secondary pressure, based on a line pressure which is a source pressure).

In this continuously variable transmission which is the both pressure regulating type, in a case where the line pressure is greater than the secondary pressure, the actual secondary pressure is vibrated in some cases. That is, the oil vibration is generated. In this case, it is conceivable to decrease the oil vibration by increasing the line pressure to be greater than the hydraulic pressure generated before the oil vibration (the pressure difference between the line pressure and the secondary pressure is further increased).

On the other hand, when the auxiliary transmission is shifted, a transmitting path of the power from a traveling drive source to a driving wheel is varied. Accordingly, the oil vibration generated before the shift maybe converged by the shift (the oil vibration generated before the shift may be generated in the transmitting path after the shift). In a case where the oil vibration is converged (decreased), it is unnecessary to increase the line pressure. The fuel consumption is deteriorated in a case where the high line pressure is maintained.

In this way, when the auxiliary transmission mechanism is shifted in a state where the line pressure is increased, it is necessary to decrease the increased line pressure. There is a room for improvement about when the increased line pressure is decreased.

PRIOR ART DOCUMENT

Patent Document

Patent Document 1: Japanese Patent Application Publication No. 2002-021994

SUMMARY OF THE INVENTION

It is, therefore, to provide a hydraulic pressure control device for a continuously variable transmission of a vehicle to attain the intended shift by stable shift characteristics when the shift is interposed during the line pressure increase control to decrease the oil vibration.

A hydraulic pressure control device for a continuously variable transmission of a vehicle according to the present invention which includes a continuously variable transmission mechanism disposed between a traveling drive source and a driving wheel; a stepwise variable transmission mechanism which is disposed in series with the continuously variable transmission mechanism, and which includes a plurality of frictional engagement elements; a shift control means configured to shift the stepwise variable transmission mechanism; a line pressure regulating valve arranged to regulate a line pressure of the continuously variable transmission mechanism and the stepwise variable transmission mechanism; a primary pressure regulating valve arranged to regulate the primary pressure based on the line pressure; and a secondary pressure regulating valve arranged to regulate the secondary pressure based on the line pressure, the hydraulic pressure control device comprises:

the shift control means including a line pressure control section configured to increase the line pressure to be greater than the line pressure before a generation of an oil vibration when the oil vibration is generated in at least one of actual hydraulic pressures of the primary pressure and the secondary pressure, and the line pressure control section being configured to continue the increase of the line pressure until the shift of the stepwise variable transmission mechanism is finished when the stepwise variable transmission is shifted in a state where the line pressure is increased.

Accordingly, when the oil vibration is generated in at least one of the actual hydraulic pressures of the primary pressure and the secondary pressure, the line pressure is increased to be greater than the line pressure before the generation of the oil vibration. In a case where the stepwise variable transmission mechanism is performed in this state where the line pressure is increased, the increase of the line pressure is continued until the shift of the stepwise variable transmission is finished.

That is, when the stepwise variable transmission is shifted, the hydraulic pressure to the stepwise transmission mechanism is needed. On the other hand, the line pressure is the pressure increased state until the shift of the stepwise variable transmission is finished. Accordingly, it is possible to perform the intended shift. Moreover, the line pressure which is the source pressure of the parts (the frictional engagement elements) shifted during the shift is not varied. Consequently, it is possible to stabilize the shift.

Therefore, when the shift is interposed during the line pressure increase control for decreasing the oil vibration, it is possible to attain the intended shift by the stable shift characteristic.

BRIEF DESCRIPTION OF DRAWINGS

FIG. 8 is a time chart showing one example of the oil vibration detection line pressure control when the belt load is low load, and showing an auxiliary shift sequence, a clutch torque (L/B), an oil vibration detection flag, a line pressure margin MIN oil vibration measure flag, hydraulic pressure command values (a line pressure command value, a SEC pressure command value), and line pressure-SEC pressure margin.

DESCRIPTION OF EMBODIMENTS

Hereinafter, an embodiment to attain a hydraulic pressure control device for a continuously variable transmission mechanism of a vehicle is explained with reference to the drawings.

Firstly, configurations are explained.

In the hydraulic pressure control device according to the embodiment, the present invention is applied to an engine vehicle including a transmission referred to as a continuously variable transmission with an auxiliary transmission. Hereinafter, configurations of a hydraulic pressure control device for the continuously variable transmission of an engine vehicle in the embodiment are explained about "Overall System Configuration", "Shift Control Configuration by Shift Map", and "Oil Vibration Detection Line Pressure Control Process Configuration".

[Overall System Configuration]

Figure 1:
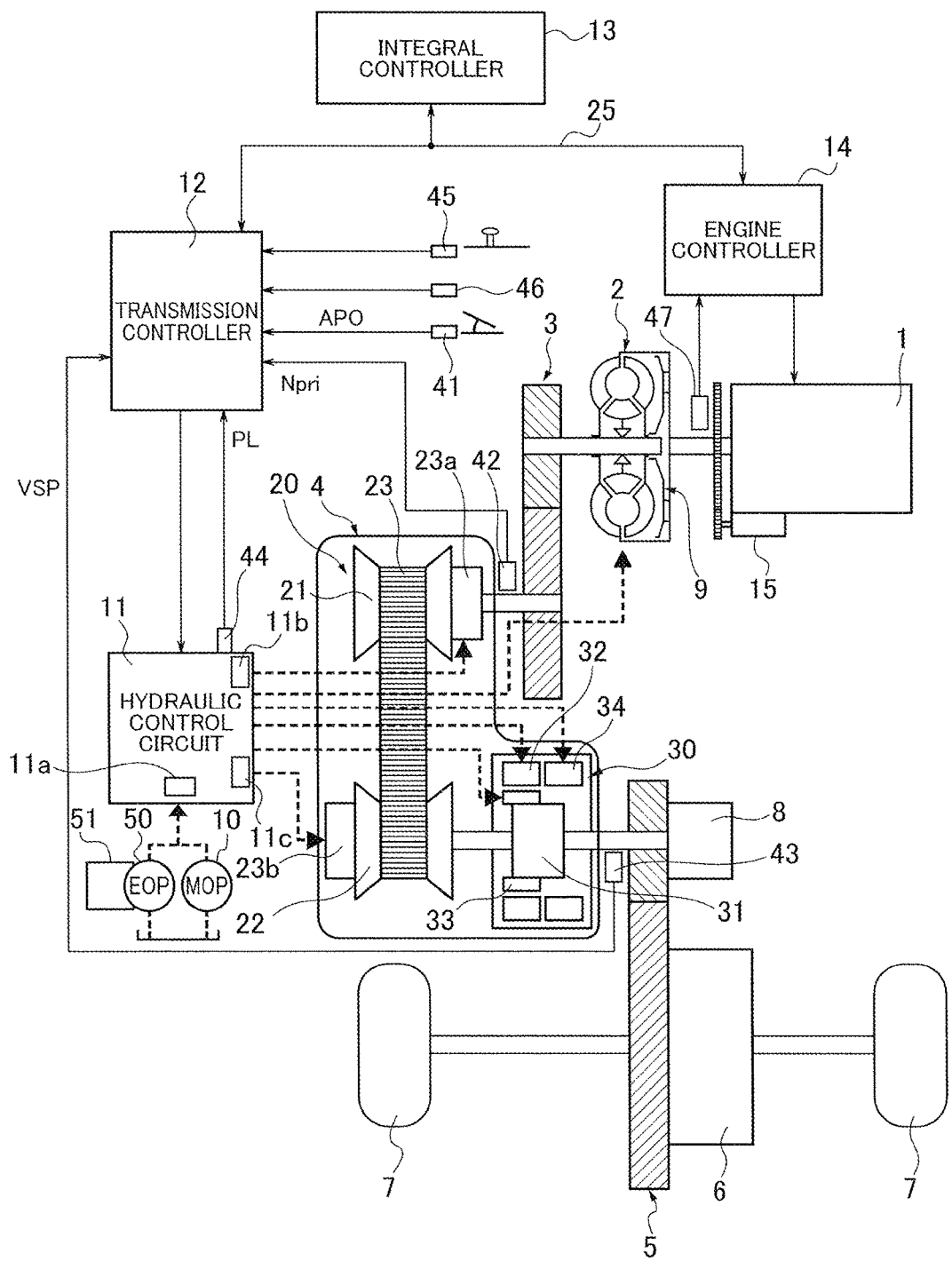
FIG. 1 is an overall configuration view showing an engine vehicle including a continuously variable transmission with an auxiliary transmission to which a control device according to an embodiment is applied.
Figure 2:
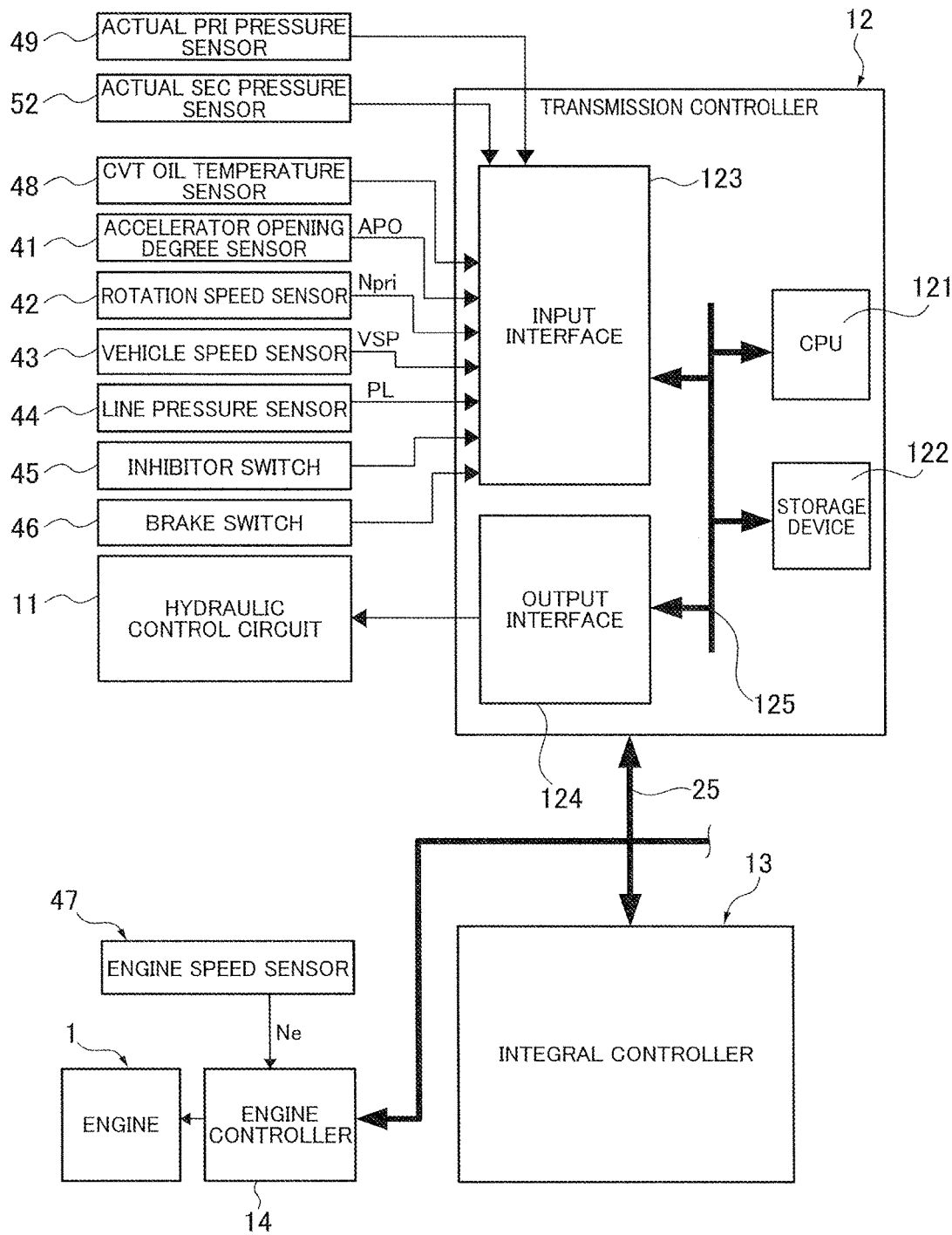
FIG. 2 is a block diagram showing a configuration of an electric control system to which the control device according to the embodiment is applied.

FIG. 1 is an overall configuration of the engine vehicle including the continuously variable transmission with the auxiliary transmission to which the control device according to the embodiment is applied. FIG. 2 is an inside configuration of the transmission controller. Hereinafter, the overall system configuration is explained with reference to FIG. 1 and FIG. 2.

Besides, in the following explanations, a "transmission gear ratio" of a transmission mechanism is a value obtained by dividing an input rotation speed of the transmission mechanism by an output rotation speed of the transmission mechanism. Moreover, a "lowest transmission gear ratio" means a maximum transmission gear ratio of the transmission mechanism. A "highest transmission gear ratio" means a minimum transmission gear ratio of the transmission mechanism.

The engine vehicle shown in FIG. 1 includes an engine 1 which is a traveling drive source, and which has a starter motor 15 for starting the engine. An output rotation of the engine 1 is transmitted to a driving wheel 7 through a torque converter 2 having a lockup clutch 9, a reduction gear train 3, a continuously variable transmission 4 (hereinafter, referred to as "automatic transmission 4") with an auxiliary transmission, a final gear train 5, a final speed reduction device 6. A parking mechanism 8 is provided to the final gear train 5. The parking mechanism 8 is arranged to mechanically lock an output shaft of the automatic transmission 4 at the parking so that the output shaft is not rotated. The engine vehicle includes, as hydraulic pressure sources, a mechanical oil pump 10 arranged to be driven by a power of the engine 1, and an electric oil pump 50 arranged to be driven by a power of the motor 51. Moreover, there are provided a hydraulic pressure control circuit 11 configured to regulate a discharge pressure from the mechanical oil pump 10 or the electric oil pump 50, and to supply the regulated pressure to respective parts of the automatic transmission 4; a transmission controller 12 configured to control the hydraulic pressure control circuit 11; an integral controller 13; and an engine controller 14. Hereinafter, respective configurations are explained.

The automatic transmission includes a belt type continuously variable transmission mechanism (hereinafter, referred to as "variator 20"); and the auxiliary transmission mechanism 30 provided in series with the variator 20. In this case, "provided in series with" means that the variator 20 and the auxiliary transmission mechanism 30 are provided in series with each other in a power transmitting path. The auxiliary transmission mechanism 30 may be directly connected to the output shaft of the variator 20 like in this example. Moreover, the auxiliary transmission mechanism 30 may be connected through other transmission mechanism or power transmitting mechanism (for example, gear row train) to the output shaft of the variator 20.

The variator 20 is a belt type continuously transmission mechanism including a primary pulley 21; a secondary pulley 22; and a V belt 23 wound around the pulleys 21 and 22. Each of the pulleys 21 and 22 includes a fixed conical plate; a movable conical plate disposed so that a sheave surface confronts the fixed conical plate to form a V groove between the fixed conical plate and the movable conical plate; and a primary hydraulic cylinder 23a and a secondary hydraulic pressure 23b which are provided, respectively, on back surfaces of the movable conical plates, and which are arranged to move the movable conical plates in axial directions. By regulating the hydraulic pressures supplied to the primary hydraulic cylinder 23a and the secondary hydraulic cylinder 23b, the widths of the V grooves are varied so that contact radii between the V belt 23 and the pulleys 21 and 22 are varied. With this, the transmission gear ratio of the variator 20 is continuously varied.

The auxiliary transmission mechanism 30 is a transmission mechanism having two forward gear stages and a reverse gear stage. The auxiliary transmission mechanism 30 includes a Ravigneaux planetary gear mechanism 31 in which carriers of two planetary gears are connected; and a plurality of frictional engagement elements (a low brake 32, a high clutch 33, and a reverse brake 34).

The gear stage of the auxiliary transmission mechanism 30 is varied by varying engagement/disengagement states of the frictional engagement elements 32 to 34 by regulating the hydraulic pressures supplied to the frictional engagement elements 32 to 34. For example, the gear stage of the auxiliary transmission mechanism 30 is brought to a first forward speed (hereinafter, referred to as "low speed mode") by the engagement of the low brake 32 and disengagements of the high clutch 33 and the reverse brake 34. The gear stage of the auxiliary transmission mechanism 30 is brought to a second forward speed (hereinafter, referred to as "high speed mode") having the transmission gear ratio smaller than the transmission gear ratio of the first speed by the engagement of the high clutch 33 and the disengagements of the low brake 32 and the reverse brake 34. Moreover, the gear stage of the auxiliary transmission mechanism 30 is brought to the reverse speed by the engagement of the reverse brake 34 and the disengagements of the low brake 32 and the high clutch 33. Besides, all of the low brake 32, the high clutch 33, and the reverse brake 34 of the auxiliary transmission mechanism 30 are disengaged, so that the driving force transmitting path to the driving wheel 7 is disconnected.

As shown in FIG. 2, the transmission controller 12 includes a CPU 121; a storage device 122 constituted by RAM·ROM; an input interface 123; an output interface 124; and a bus 125 connecting these components. This transmission controller 12 is configured to control the transmission gear ratio of the variator 20, and to perform changeover of the plurality of the frictional engagement elements (the low brake 32, the high clutch 33, and the reverse brake 34) of the auxiliary transmission mechanism 30 to attain a predetermined gear stage.

The input interface 123 receives an output signal of an accelerator opening degree sensor 41 arranged to sense a depression opening degree of an accelerator pedal (hereinafter, referred to as "accelerator opening degree APO"), an output signal of a rotation speed sensor 42 arranged to sense an input rotation speed of the automatic transmission 4 (=the primary pulley rotation speed, hereinafter, referred to as "primary rotation speed Npri"), an output signal of a vehicle speed sensor 43 arranged to sense a traveling speed of the vehicle (hereinafter, referred to as "vehicle speed VSP"), an output signal of a line pressure sensor 44 arranged to sense a line pressure of the automatic transmission 4 (hereinafter, referred to as "line pressure PL"), an output signal of an inhibitor switch 45 arranged to sense a position of a select lever, an output signal of a brake switch 46 arranged to sense a brake state, and so on. Moreover, the input interface 123 receives an output signal of a CVT oil temperature sensor 48 arranged to sense a temperature of a transmission hydraulic fluid, an output signal of an actual PRI pressure sensor 49 arranged to sense an actual primary pressure, and an output signal of an actual SEC pressure sensor 52 arranged to sense an actual secondary pressure Psec.

The storage device 122 stores a shift control program of the automatic transmission 4, and a shift map (FIG. 3) used in this shift control program. The CPU 121 reads the shift control program stored in the storage device 122, and executes the shift control program. The CPU 121 performs various calculation processes to various signals inputted through the input interface 123 to produce the shift control signals. The CPU 121 outputs the produced shift control signals through the output interface 124 to the hydraulic pressure control circuit 11. The various values used in the calculation process by the CPU 121, and the calculation results are stored in the storage device 122.

The hydraulic pressure control circuit 11 is constituted by a plurality of flow passages, and a plurality of hydraulic control valves. The hydraulic pressure control circuit 11 is configured to control the plurality of the hydraulic pressure control valves based on the shift control signals from the transmission controller 12, and thereby to switch a supply passage of the hydraulic pressure. This hydraulic pressure control circuit includes, as a plurality of hydraulic pressure regulating valves, a line pressure regulating valve 11a, a primary pressure regulating valve 11b, and a secondary pressure regulating valve 11c. The line pressure regulating valve 11a is arranged to regulate the line pressure PL which is the source pressure of the control hydraulic pressure to the variator 20 and the auxiliary transmission mechanism 30 based on the pump discharge pressure. The primary pressure regulating valve 11b is arranged to regulate the primary pressure Ppri to the primary hydraulic pressure cylinder 23a based on the line pressure. The secondary pressure regulating valve 11c is arranged to regulate the secondary pressure Psec to the secondary pressure cylinder 23 based on the line pressure PL.

The integral controller 13 is configured to integrally monitor the plurality of the controllers mounted on the vehicle so as to appropriately ensure the transmission control by the transmission controller 12, and the engine controller by the engine controller 14. This integral controller 13 is connected through the CAN communication line 25 to the vehicle mounted controller such as the transmission controller 12 and the engine controller 14 so as to exchange the information.

The engine controller 14 performs a fuel cut control of the engine 1 at the accelerator release operation, an engine start control to start the engine 1 by using the starter motor 15, and so on. This engine controller 14 receives an output signal of an engine speed sensor 47 arranged to sense a rotation speed of the engine 1 (hereinafter, referred to as "engine speed Ne"), and so on.

[Shift Control Configuration Based on Shift Map]

Figure 3:
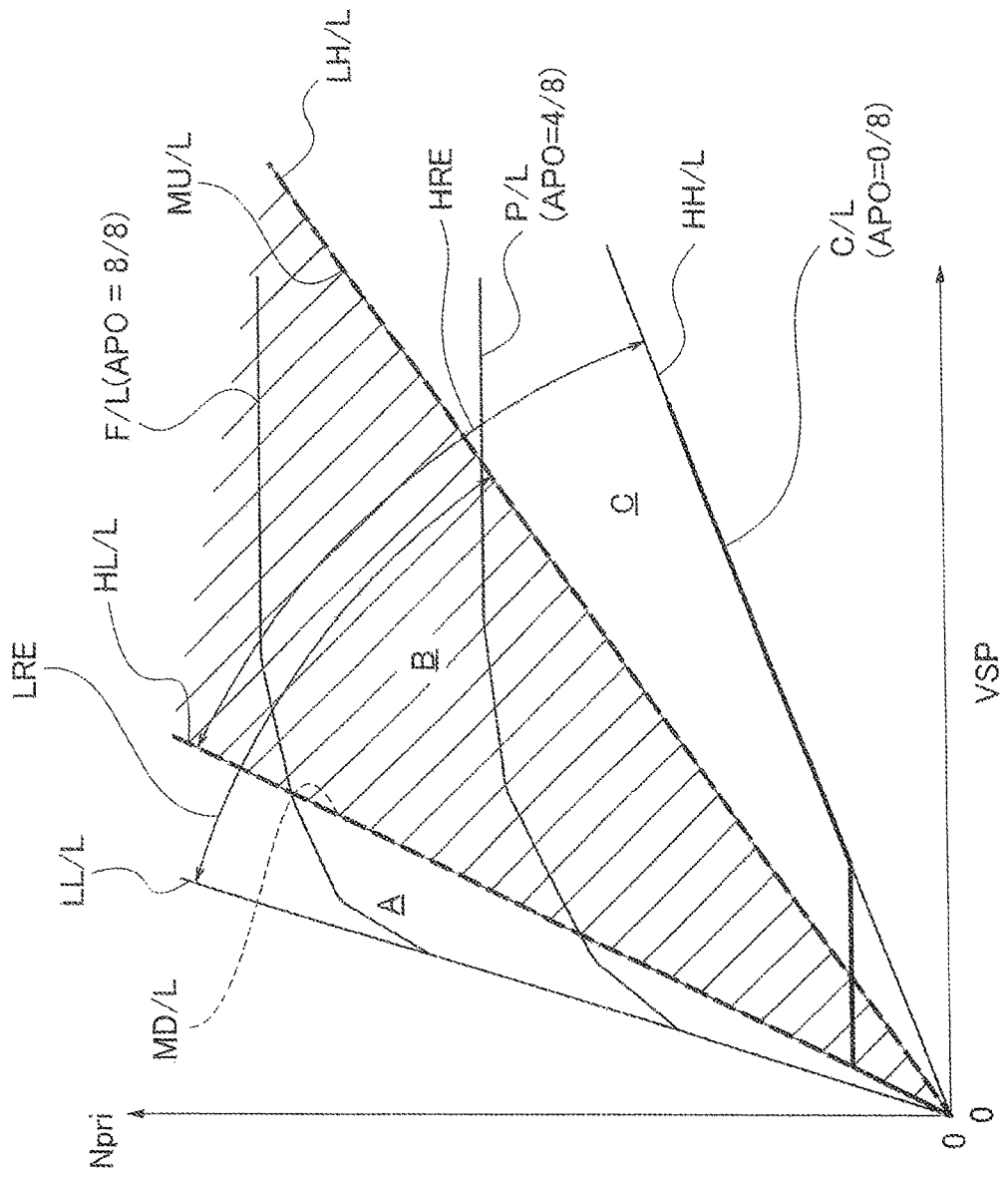
FIG. 3 is a shift map diagram showing one example of a shift map stored in a storage device of a transmission controller in the embodiment.

FIG. 3 shows one example of the shift map stored in the storage device of the transmission controller. Hereinafter, the shift control configuration based on the shift map is explained.

An operating point of the automatic transmission 4 is determined by the vehicle speed VSP and the primary rotation speed Npri on the shift map shown in FIG. 3. A gradient of the line connecting the operating point of the automatic transmission 4 and zero at lower left corner of the shift map represents the transmission gear ratio of the automatic transmission 4 (an overall transmission gear ratio obtained by multiplying the transmission gear ratio vRatio of the variator 20 by the transmission gear ratio subRatio of the auxiliary transmission mechanism 30, hereinafter, referred to as "through transmission gear ratio Ratio").

In this shift map, a shift line is set at each accelerator opening degree APO, like the shift map of the conventional belt continuously variable transmission. The shift of the automatic transmission 4 is performed along the shift line selected in accordance with the accelerator opening degree APO. For the sake of simplicity, FIG. 3 shows only a full load line F/L (a shift line at the accelerator opening degree APO=8/8), a partial line P/L (a shift line at the accelerator opening degree APO=4/8), and a coast line C/L (a shift line at the accelerator opening degree=0).

When the automatic transmission 4 is in the low speed mode, the automatic transmission 4 can be shifted between a low speed mode lowest line LL/L obtained when the transmission gear ratio vRatio of the variator 20 is maximized, and a low speed mode highest line LH/L when the transmission gear ratio vRatio of the variator 20 is minimized. In this case, the operating point of the automatic transmission 4 is moved in an A region and a B region. On the other hand, when the automatic transmission 4 is in the high mode, the automatic transmission 4 can be shifted between a high speed mode lowest line HL/L obtained when the transmission gear ratio vRatio of the variator 20 is maximized, and a high speed highest line HH/L obtained when the transmission gear ratio vRatio of the variator 20 is minimized. In this case, the operating point of the automatic transmission 4 is moved in the B region and in a C region.

The transmission gear ratios of the gear stages of the auxiliary transmission mechanism 30 are set so that the transmission gear ratio (the low speed mode highest transmission gear ratio) corresponding to the low speed mode highest line LH/L is smaller than the transmission gear ratio (the high speed mode lowest transmission gear ratio) corresponding to the high speed mode lowest line HL/L. With this, a low speed mode ratio region LRE of the through transmission gear ratio Ratio which can be attained by the automatic transmission 4 in the low speed mode is partially overlapped with a high speed mode ratio region HRE of the through transmission gear ratio Ratio which can be attained by the automatic transmission 4 in the high speed mode. When the operating point of the automatic transmission 4 is in the B region (overlap region) which is sandwiched by the high speed mode lowest line HL/L and the low speed mode highest line LH/L, the automatic transmission 4 can select either the low speed mode or the high speed mode.

The transmission controller 12 is configured to set the through transmission gear ratio Ratio corresponding to the vehicle speed VSP and the accelerator opening degree APO (the driving state of the vehicle) to a desired through transmission gear ratio DRatio, with reference to this shift map. This desired through transmission gear ratio DRatio is a target value which the through transmission gear ratio Ratio finally reaches in this driving state. Moreover, the transmission controller 12 sets a target through transmission gear ratio tRatio which is a transient target value by which the through transmission gear ratio Ratio is followed to the desired transmission gear ratio DRatio by a desired response characteristic. The transmission controller 12 controls the variator 20 and the auxiliary transmission mechanism 30 so that the through transmission gear ratio Ratio corresponds to the target through transmission gear ratio tRatio.

In the shift map, a mode switching upshift line MU/L (1→2 upshift line of the auxiliary transmission mechanism 30) to perform the upshift of the auxiliary transmission mechanism 30 is set to be substantially overlapped with the low speed mode highest line LH/L. The through transmission gear ratio Ratio corresponding to the mode switching upshift line MU/L is substantially identical to the low speed mode highest line LH/L (the low speed mode highest transmission gear ratio). Moreover, in the shift map, a mode switching downshift line MD/L (2→1 downshift line of the auxiliary transmission mechanism 30) to perform the downshift of the auxiliary transmission mechanism 30 is set to be substantially overlapped with the high speed mode lowest line HL/L. The through transmission gear ratio Ratio corresponding to the mode switching downshift line MD/L is substantially identical to the high speed mode lowest transmission gear ratio (the high speed mode lowest line HL/L).

Then, when the operating point of the automatic transmission 4 is moved across the mode switching upshift line MU/L or the mode switching downshift line MD/L, that is, when the target through transmission gear ratio tRatio of the auxiliary transmission mechanism is varied to be moved across the mode switching transmission gear ratio mRatio, or to correspond to the mode switching transmission gear ratio mRatio, the transmission controller 12 is configured to perform the mode switching shift control. In this mode switching shift control, the transmission controller 12 is configured to perform a "cooperative control" to shift the auxiliary transmission mechanism 30, and to vary the transmission gear ratio vRatio of the variator 20 in a direction opposite to the direction of the variation of the transmission gear ratio subRatio of the auxiliary transmission mechanism 30.

In the "cooperative control", when the target through transmission gear ratio tRatio of the automatic transmission 4 is moved across the switching upshift line MU/L from the B region side to the C region side, or when the target through transmission gear ratio tRatio of the automatic transmission 4 corresponds to the mode switching upshift line MU/L from the B region side, the transmission controller 12 is configured to output the 1→2 upshift judgment, and to vary the gear stage the auxiliary transmission mechanism 30 from the first speed to the second speed. Moreover, the transmission controller 12 is configured to vary the transmission gear ratio vRatio of the variator 20 from the highest transmission gear ratio toward the low transmission gear ratio. Conversely, when the target through transmission gear ratio tRatio of the automatic transmission 4 is moved across the mode switching downshift line MD/L from the B region side to the A region side, or when the target through transmission gear ratio tRatio corresponds to the mode switching downshift line MD/L from the B region side, the transmission controller 12 is configured to output 2→1 downshift judgment, and to vary the gear stage of the auxiliary transmission mechanism 30 from the second speed to the first speed. Moreover, the transmission controller 12 is configured to vary the transmission gear ratio vRatio of the variator 20 from the lowest transmission gear ratio toward the highest transmission gear ratio.

In the mode switching upshift or the mode switching downshift, the "cooperative control" to vary the transmission gear ratio vRatio of the variator 20 is performed. With this, it is possible to suppress the unnatural feeling of the driver due to the variation of the input rotation speed which is generated by the stepwise change of the through transmission gear ratio Ratio of the automatic transmission 4, and to ease the shift shock of the auxiliary transmission mechanism 30.

[Oil Vibration Detection Line Pressure Control Process Configuration]

Figure 4:
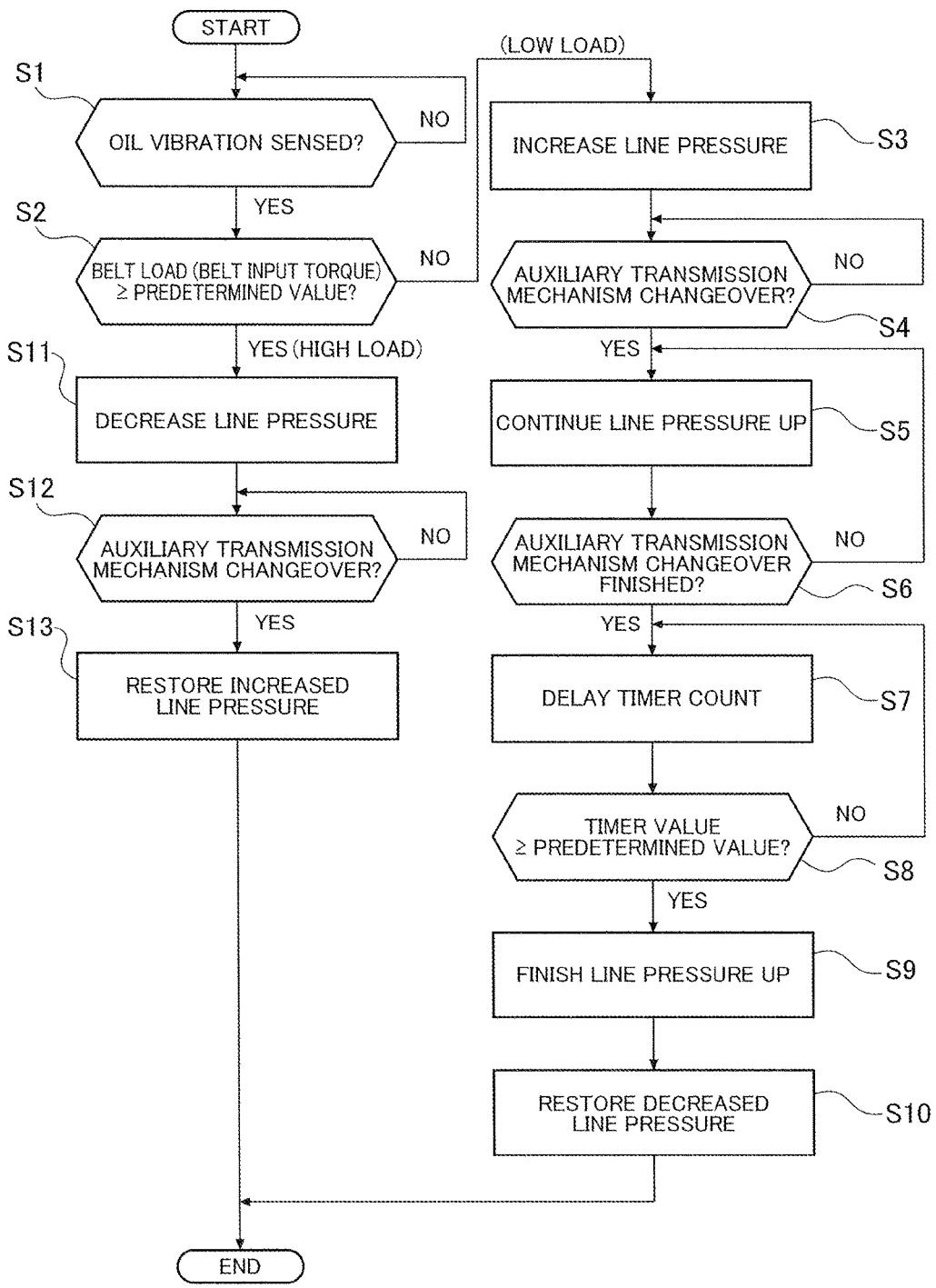
FIG. 4 is a flowchart showing a flow of an oil vibration line pressure control process performed in the transmission controller in the embodiment.

FIG. 4 shows a flow of the oil vibration detection line pressure control process configuration (line pressure control section) performed in the transmission controller 12 (the shift control means). Hereinafter, steps of FIG. 4 which represents the oil vibration detection line pressure control process configuration are explained.

At step S1, it is judged whether or not the oil vibration is sensed in at least one of the actual primary pressure Ppri and the actual secondary pressure Psec. In case of YES (the oil vibration is sensed), the process proceeds to step S2. In case of No (the oil vibration is not sensed), the process repeats the judgment of step S1.

In this case, in the "oil pressure detection", the output signals from the actual PRI pressure sensor 49 and the actual SEC pressure sensor 52 are monitored when the pressure command is constant. When a state where the oil vibration due to the hydraulic pressure variation which exceeds the pressure command by a predetermined width is continued during a predetermined time period, the oil vibration is sensed.

Subsequently to the judgment of the oil vibration detection at step S1, it is judged whether or not the belt load (belt input torque) is equal to or greater than a predetermined value at step S2. In case of YES (the belt load≥a predetermined value: the high load), the process proceeds to step S11. In case of NO (the belt load<the predetermined value: the low load), the process proceeds to step S3.

In this case, the "belt load" is the engine torque Te from the engine controller 14 at the engagement of the lockup clutch 9. The "belt load" is estimated by the torque ratio between the engine torque Te and the torque converter 2 at the disengagement of the lockup clutch 9. The "predetermined value" is set based on "whether or not the SEC pressure before increase is a value that is not increased to the SEC pressure according to the increased acceleration request during a predetermined time period from the increase of the acceleration request when the acceleration request is increased".

Subsequently to the judgment of "the belt load<the predetermined value, that is, the low load" at step S2, the line pressure PL is increased to be greater than the line pressure PL before the generation of the oil vibration at step S3. The process proceeds to step S4.

In this case, the line pressure PL at the low load is set to the low hydraulic pressure even when the safety factor is multiplied, since the necessary pressure for preventing the generation of belt slippage is low. Accordingly, the increase width of the line pressure PL at step S3 is increased so as to ensure the pressure difference between the line pressure PL needed for decreasing the oil vibration, and the secondary pressure Psec (or the primary pressure Ppri).

Moreover, at the increase of the line pressure PL, a line pressure command is increased from the line pressure PL before the increase at a predetermined ramp gradient.

Subsequently to the increase of the line pressure PL at step S3, it is judged whether or not the auxiliary transmission mechanism 30 is during the changeover shift at step S4. In case of YES (during the changeover of the auxiliary transmission mechanism), the process proceeds to step S5. In case of NO (the gear position of the auxiliary transmission mechanism is fixed), the process repeats the judgment of step S4.

In this case, the changeover shift of the auxiliary transmission mechanism 30 is during the shift control by the changeover by the engagement of one of the low brake 32 (L/B) and the high clutch 33 (H/C), and the disengagement of the other of the low brake 32 (L/B) and the high clutch 33 (H/C), based on the upshift request or the downshift request.

Subsequently to the judgment that the auxiliary transmission mechanism is during the changeover shift at step S4, or subsequently to the judgment that the changeover of the auxiliary transmission mechanism is not finished at step S4, the increase of the line pressure PL at step S3 is continued at step S5. The process proceeds to step S6.

Subsequently to the continuation of the increase of the line pressure PL at step S5, it is judged whether or not the changeover shift of the auxiliary transmission mechanism 30 is finished at step S6. In case of YES (the changeover of the auxiliary transmission mechanism is finished), the process proceeds to step S7. In case of NO (the changeover of the auxiliary transmission mechanism is not finished),the process returns to step S5.

Subsequently to the judgment that the changeover of the auxiliary transmission mechanism is finished at step S6, or subsequently to the judgment of "the timer<the predetermined value" at step S8, a timer value of a delay timer which is started from the judgment of the completion of the changeover of the auxiliary transmission mechanism is counted at step S7. The process proceeds to step S8.

Subsequently to the count of the delay timer at step S7, it is judged whether or not the timer value of the delay timer is equal to or greater than a predetermined value at step S8. In case of YES (the timer value≥the predetermined value), the process proceeds to step S9. In case of NO (the timer value<the predetermined value), the process returns to step S7.

In this case, the delay time period which is the "predetermined value" is set to a time period during which the actual pressure of the decreased secondary pressure Psec is stabilized, that is, the actual pressure of the secondary pressure Psec is converged to the decreased hydraulic pressure command.

Subsequently to the judgment of the timer value≥the predetermined value at step S8, the increase of the line pressure Pl is finished after the delay timer time period is elapsed from the judgment of the completion of the changeover of the auxiliary transmission mechanism at step S9. The process proceeds to step S10.

Subsequently to the end of the increase of the line pressure at step S9, the pressure command of the line pressure PL is returned to a previous pressure command before the increase of the line pressure PL so that the increased line pressure PL is returned to the previous line pressure PL. The process proceeds to the end.

In this case, when the line pressure PL is returned, the line pressure command is decreased from the increased line pressure PL at a predetermined ramp gradient.

Subsequently to the judgment of the belt load≥the predetermined value and the high load at step S2, the line pressure PL is decreased to be smaller than the line pressure PL before the generation of the oil vibration at step S11, the process proceeds to step S12.

In this case, the line pressure PL at the high load is set to the high hydraulic pressure by multiplying the high necessary pressure by the safety factor, since the necessary pressure for preventing the belt slippage is high. Accordingly, the decrease width of the line pressure PL at step S11 is decreased to delete a margin which is a hydraulic pressure corresponding to the safety factor while ensuring the necessary pressure.

Subsequently to the decrease of the line pressure PL at step S11, or the judgment that the gear position of the auxiliary transmission mechanism is fixed at step S12, it is judged whether or not the auxiliary transmission mechanism 30 is during the changeover shift at step S12. In case of YES (the auxiliary transmission mechanism is during the changeover), the process proceeds to step S13. In case of NO (the gear position of the auxiliary transmission mechanism is fixed), the process repeats the judgment of step S12.

In this case, the changeover shift of the auxiliary transmission mechanism 30 is during the shift control by the changeover by the engagement of one of the low brake 32 (L/B) and the high clutch 33 (H/C), and the disengagement of the other of the low brake 32 (L/B) and the high clutch 33 (H/C), based on the upshift request or the downshift request.

Subsequently to the judgment that the auxiliary transmission is during the changeover shift at step S12, the decreased line pressure PL is returned to the previous line pressure PL at step S13. The process proceeds to the end.

In this case, the return of the decreased line pressure PL to the previous line pressure PL means that the line pressure PL is increased so that the margin between the line pressure PL after the return and the SEC pressure Psec corresponds to the margin between the line pressure PL before the decrease and the SEC pressure Psec.

In this case, when the line pressure PL is returned to the previous line pressure PL, the line pressure command is increased from the decreased line pressure PL at a predetermined ramp gradient.

Next, operations are explained.

The operations in the hydraulic pressure control device for the continuously variable transmission of the engine vehicle in the embodiment are explained about "Oil Vibration Detection Line Pressure Control Process Operation", "Oil Vibration Detection Line Pressure Control Operation", and "Oil Vibration Detection Line Pressure Control Characteristic Operation".

[Oil Vibration Detection Line Pressure Control Process Operation]

Figure 5:
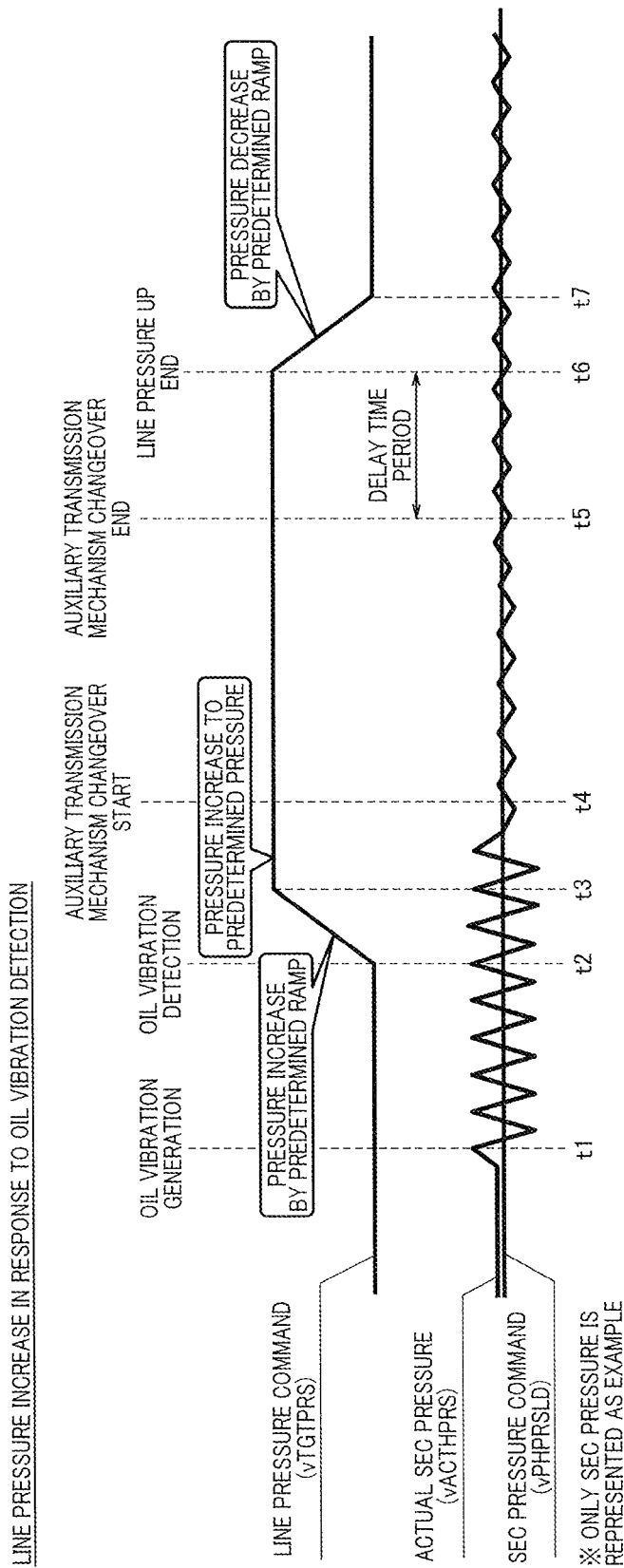
FIG. 5 is a time chart showing characteristics of a line pressure command (vTGTPRS), a SEC pressure command (vPHPRSLD), an actual SEC pressure (vACTHPRS), when the line pressure is increased in response to the oil vibration detection in the oil vibration detection line pressure control process.
Figure 6:
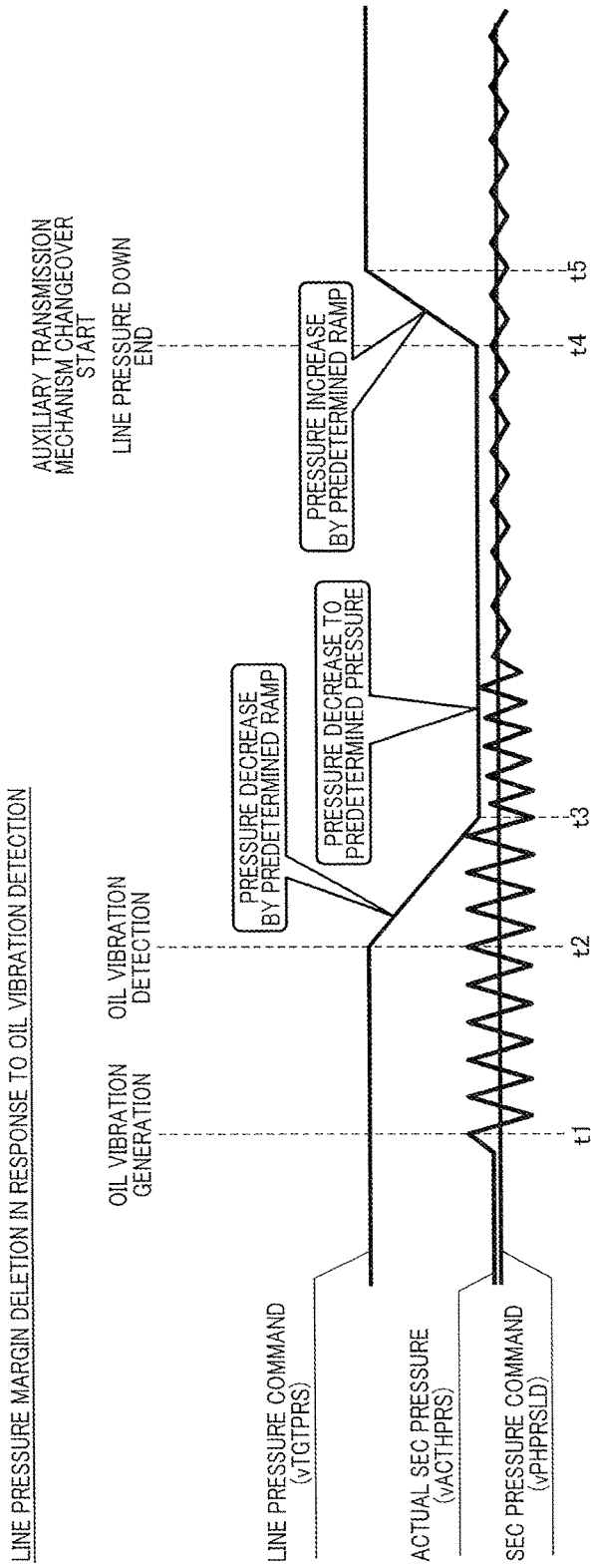
FIG. 6 is a time chart showing characteristics of a line pressure command (vTGTPRS), a SEC pressure command (vPHPRSLD), an actual SEC pressure (vACTHPRS), in response to the oil vibration detection in the oil vibration detection line pressure control process, when the line pressure margin is deleted (decreased).

The oil vibration detection line pressure control process operation is explained about the low load state and the high load state, based on a flowchart shown in FIG. 4 and time charts shown in FIG. 5 and FIG. 6.

(Low Load State)

When the oil vibration is sensed in the low load state of the belt load the predetermined value, the process proceeds along step S1 step S2 step S3 step S4 in the flowchart of FIG. 4. At step S3, the line pressure PL is increased to be greater than the line pressure PL before the generation of the oil vibration while it is judged that the gear position of the auxiliary transmission mechanism is fixed at step S4.

Then, when the changeover shift of the auxiliary transmission mechanism 30 is started, the process proceeds along step S4→step S5→step S6. The flow of step S5→step S6 is repeated while it is judged that the changeover of the auxiliary transmission mechanism is not finished at step S6. At step S5, the increase of the line pressure PL at step S3 is continued.

When it is judged that the changeover of the auxiliary transmission mechanism is finished at step S6, the process proceeds along step S6→step S7→step S8. The flow of step S7→step S8 is repeated while the timer<the predetermined value is judged at step S8. At step S7, the timer value of the delay timer which is started from the judgment of the completion of the changeover of the auxiliary transmission mechanism is counted.

Then, when the timer value≥the predetermined value is judged at step S8, the process proceeds along step S8→step S9→step S10→the end. At step S9, the increase of the line pressure PL is finished after the delay timer time period is elapsed from the judgment of the completion of the changeover of the auxiliary transmission mechanism. At step S10, the pressure command of the line pressure PL is returned to the previous pressure command before the increase of the line pressure PL.

In this way, in the line pressure control when the oil vibration is sensed in the low load state, as shown in FIG. 5, the oil vibration is generated at time t1. When the oil vibration is sensed at time t2, the line pressure command is increased at the predetermined ramp gradient from time t2 to time t3. The increase width of the line pressure command at this time is the increase width to ensure the necessary pressure difference to decrease the oil vibration, as the pressure difference of the line pressure PL and the secondary pressure Psec (or the primary pressure Ppri).

The state where the line pressure PL is increased is maintained from time t3. At time t4, the changeover shift of the auxiliary transmission mechanism 30 is started. At time t5, the changeover shift of the auxiliary transmission mechanism 30 is finished. At time t6 at which the delay time period by which the actual pressure of the decreased secondary pressure is stabilized is elapsed from time t5, the increase of the line pressure PL is finished. When the increase of the line pressure PL is finished, the line pressure command is decreased from the increased line pressure PL at the predetermined ramp gradient. With this, the line pressure PL is returned to the previous line pressure PL at time t7.

(High Load State)

When the oil vibration is sensed in the high load state of the belt load>the predetermined value, the process proceeds along step S1→step S2→step S11→step S12 in the flowchart of FIG. 4. At step S11, the line pressure PL is decreased to be smaller than the line pressure PL before the generation of the oil vibration while it is judged that the gear position of the auxiliary transmission mechanism is fixed at step S12.

Then, when the changeover shift of the auxiliary transmission mechanism 30 is started, the process proceeds along step S12→step S13. At step S13, the decrease of the line pressure PL is returned.

In this way, in the line pressure control when the oil vibration is sensed in the high load state, as shown in FIG. 6, the oil vibration is generated at time t1. When the oil vibration is sensed at time t2, the line pressure command is decreased at the predetermined ramp gradient from time t2 to time t3. The decrease width of the line pressure command at this time is the decrease width to delete the margin which is the hydraulic pressure amount corresponding to the safety factor, and to ensure the necessary pressure by which the belt slippage is not generated.

The state where the line pressure PL is decreased is maintained from time t3. When the changeover shift of the auxiliary transmission mechanism 30 is started at time t4, the pressure decrease of the line pressure PL is finished. When the pressure decrease of the line pressure is finished, the line pressure command is increased from the decreased line pressure PL at the predetermined ramp gradient, so that the line pressure PL is returned at the time t5.

[Oil Vibration Detection Line Pressure Control Operation]

Firstly, definitions of the "low load" and the "high load" are explained.

As described at step S2 of FIG. 4, the state where the belt load (the belt input torque) is smaller than the predetermined value is the low load. The state where the belt load (the belt input torque) is equal to or greater than the predetermined value is the high load.

When the accelerator request from the driver is increased, the belt load (the belt input torque) is increased. Accordingly, it is necessary to increase the secondary pressure (=SEC pressure) to a value which can resist the increased belt load. The SEC pressure before the increase of the acceleration request is lower as the belt load before the increase of the acceleration request is lower. The difference between the SEC pressure before the increase and the SEC pressure according to the acceleration request is greater as the SEC pressure before the increase is lower. Accordingly, a time period after which the SEC pressure becomes the SEC pressure according to the acceleration request becomes long. In a case where the increase of the SEC pressure is not finished during the predetermined time period from the start of the increase of the acceleration request, the SEC pressure is deficient with respect to the increased belt load, so that the belt slippage is generated. Therefore, it is necessary to finish the increase during the predetermined time period from the start of the increase of the acceleration request, for preventing the generation of the belt slippage.

Accordingly, the low load or the high load is defined based on "whether or not the SEC pressure before the increase is a value by which it cannot be increased to the SEC pressure according to the increased acceleration request during the predetermined time period from the start of the increased of the acceleration request when the acceleration request is increased". That is, in a case where it is not possible to finish the increase during the predetermined time period due to the SEC pressure before the increase, it is the low load. In a case where it is possible to finish the increase during the predetermined time period due to the SEC pressure before the increase, it is the high load.

In case of the low load by which the increase is not finished during the predetermined time period, the line pressure PL which is the source pressure of the SEC pressure is increased for rapidly increasing the SEC pressure based on the acceleration request. With this, the time period for the increase of the SEC pressure is shortened. The SEC pressure before the increase is set in accordance with the belt load. Accordingly, at step S2 of FIG. 4, a threshold value of the belt load for judging whether or not the increase is finished during the predetermined time period is set to the "predetermined value". By comparing the belt load and the predetermined value, it is judged whether it is the low load or the high load.

In this case, the acceleration request is a maximum acceleration request from the driver. Specifically, the acceleration request is the full depression of the accelerator pedal. On the other hand, at the high load, the SEC pressure before the acceleration request is high so that the SEC pressure can be increased to the value according to the acceleration request during the predetermined time period. Accordingly, it is unnecessary to increase the line pressure PL which is the source pressure of the SEC pressure. The fuel consumption is improved by decreasing the line pressure PL. The line pressure PL after the decrease at the high load is set to a lowest limit value by which the SEC pressure can be increased to the value according to the acceleration request during the predetermined time period.

With this, it is possible to prevent the belt slippage, and to improve the fuel consumption by decreasing the line pressure PL.

Accordingly, at the low load, it is possible to rapidly increase the SEC pressure by increasing the line pressure PL which is the source pressure of the SEC pressure, even when the margin amount is small. On the other hand, at the high load, it is possible to increase the SEC pressure based on the driving force request since the margin amount is large.

In consideration of the above-described matter, the line pressure control at the oil vibration detection is divided into when the belt load is the low load, and when the belt load is the high load. At the low load, the line pressure PL is increased to decrease the oil vibration. At the high load, the line pressure PL is decreased to decrease the oil vibration. Moreover, the oil vibration detection line pressure control considers when the line pressure increased at the low load is decreased, and when the line pressure decreased at the high load is increased. Hereinafter, the oil vibration detection line pressure control operation is explained about the low load (FIG. 7) and the high load (FIG. 8).

Figure 7:
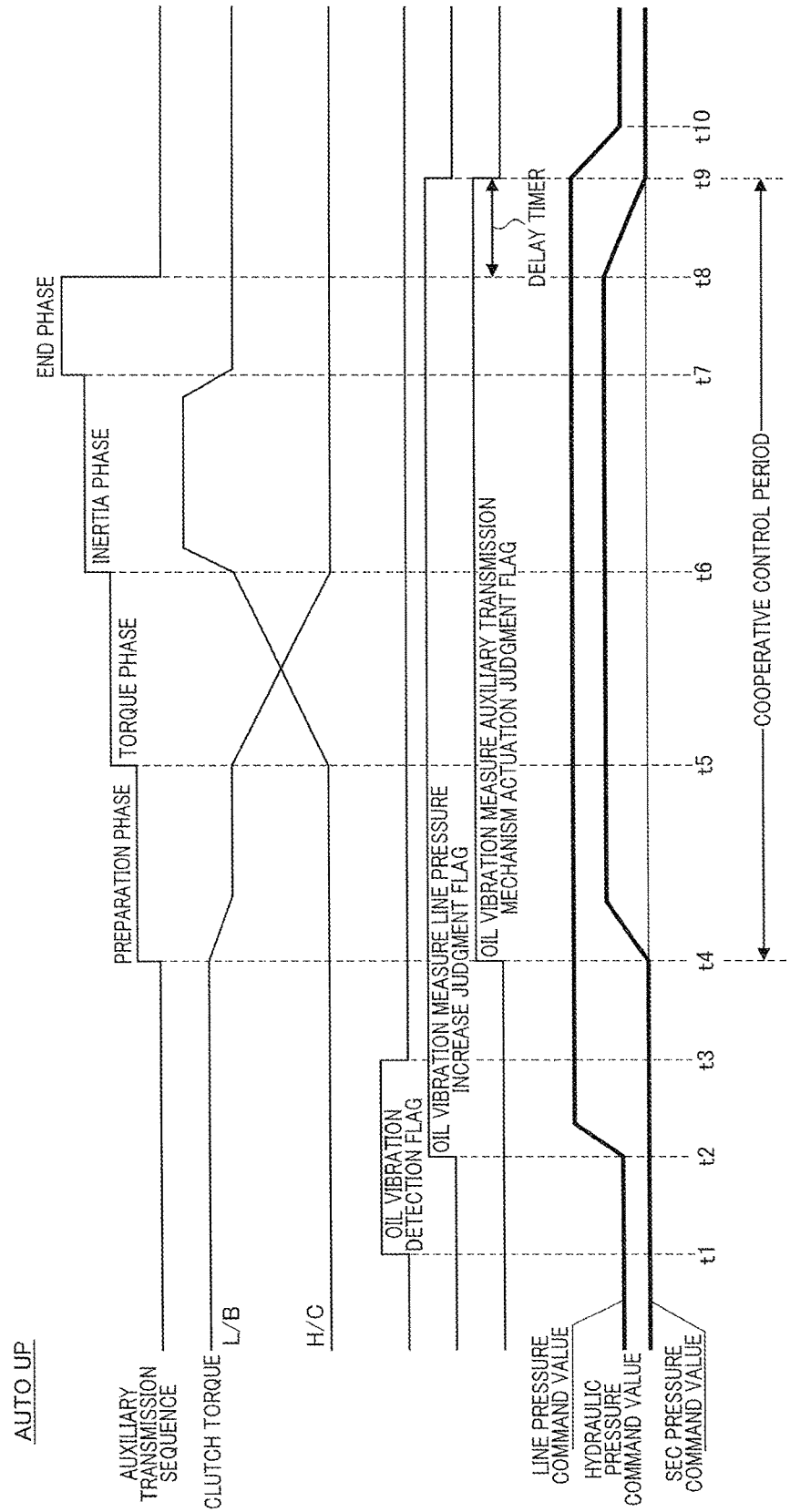
FIG. 7 is a time chart showing one example of the oil vibration detection line pressure control when the belt load is low load, and showing an auxiliary shift sequence, a clutch torque (L/B), an oil vibration detection flag, an oil vibration measure line pressure increase judgment flag, an oil vibration measure auxiliary transmission mechanism actuation judgment flag, hydraulic pressure command values (a line pressure command value, a SEC pressure command value).

(Low Load State: FIG. 7)

FIG. 7 is a time chart showing one example of the oil vibration detection line pressure control when the belt load is the low load.

In FIG. 7, a time t1 is a time of the oil vibration generation. A time t2 is a time of the line pressure increase start. A time t3 is a time of the oil vibration convergence. A time t4 is a time of the start of the changeover shift of the auxiliary transmission mechanism. A time t5 is a time of a torque phase start. A time t6 is a time of an inertia phase start. A time t7 is a time of an end phase start. A time t8 is a time of the end of the changeover shift of the auxiliary transmission mechanism. A time t9 is a time of the end of the line pressure increase. A time t10 is a time of the return of the line pressure. Besides, a time period from time t1 to time t3 is an oil vibration detection flag ON section. A time period from time t2 to time t9 is an oil vibration measure (countermeasure) line pressure increase judgment flag ON section. A time period t4 to t9 is an oil vibration measure (countermeasure) auxiliary transmission mechanism actuation judgment flag ON section (=the cooperative control section).

At time t1, the oil vibration is generated during the traveling when the gear position is the first speed at the low load of the belt load. At time t2, the pressure increase of the line pressure PL is started as the oil vibration measure (countermeasure). Even when the oil vibration is converged at time t3 by the increase of the line pressure command value at time t2, the oil vibration may be generated by the decrease of the line pressure. Accordingly, the line pressure command value is maintained to the increase state. Then, at time t4, the changeover upshift of the auxiliary transmission mechanism 30 from the first speed to the second speed by the disengagement of the low brake 32 and the engagement of the high clutch 33 is started. At time t8, the changeover upshift is finished. The changeover upshift of the auxiliary transmission mechanism 30 is performed along the preparation phase from time t4 to time t5, the torque phase from time t5 to time t6, the inertia phase from time t6 to time t7, the end phase from time t7 to time t8. During the time period from time t4 to time t8, which corresponds to the changeover upshift of the auxiliary transmission mechanism 30, the SEC pressure command is increased. With this, the variator is downshifted, so that the cooperative control is performed so as to maintain the through transmission gear ratio of the automatic transmission 4 to the constant.

Then, at time t8, the changeover upshift of the auxiliary transmission mechanism 30 is finished. At time t9 after the time period by the delay timer is elapsed, the increase of the line pressure PL is finished. At time t10, the line pressure PL is returned to the value before the pressure increased.

Accordingly, in the oil vibration detection line pressure control when the belt load is the low load, as shown in FIG. 7, the increase of the line pressure PL is started at time t2 as the oil vibration measure (the countermeasure). The increase of the line pressure PL is maintained even at the interposition of the changeover upshift of the auxiliary transmission mechanism 30 from time t4. Then, at time t8, the changeover upshift of the auxiliary transmission mechanism 30 is finished. At time t9 at which the time period by the delay timer is elapsed, the increase of the line pressure is finished. That is, the oil vibration measure auxiliary transmission mechanism actuation judgment flag ON section is the line pressure increase section as the oil vibration measure.

(High Load State: FIG. 8)

FIG. 8 is a time chart showing one example of the oil vibration detection line pressure control when the belt load is the high load.

In FIG. 7, a time t1 is a time of the oil vibration generation. A time t2 is a time of the line pressure decrease start. A time t3 is a time of the end of the line pressure decrease (the time of the start of the changeover shift of the auxiliary transmission mechanism). A time t4 is a time of a torque phase start. A time t5 is a time of an inertia phase start. A time t6 is a time of an end phase start. A time t7 is a time of the end of the changeover shift of the auxiliary transmission mechanism. A time t8 is a time of the decrease of the line pressure increase. A time t9 is a time of the return of the line pressure. Besides, a time period from time t1 is an oil vibration detection flag ON section. A time period from time t2 to time t3 is a line pressure margin MIN oil vibration measure (countermeasure) flag ON section. A time period t3 to t8 is the cooperative control section.

At time t1, the oil vibration is generated during the traveling when the gear position is the first speed at the high load of the belt load. At time t2, the pressure decrease of the line pressure PL is started as the oil vibration measure (countermeasure). In the pressure decrease of the line pressure PL, the line pressure command value is decreased at time t2, so that the margin (the difference) between the line pressure and the SEC pressure is set to the minimum value, for example, zero. Then, at time t3, the changeover upshift of the auxiliary transmission mechanism 30 from the first speed to the second speed by the disengagement of the low brake 32 and the engagement of the high clutch 33 is started. At time t3, the pressure decrease of the line pressure PL which is the oil vibration measure (countermeasure) is finished. From time t3, the line pressure command value is returned by the line pressure margin during the actuation of the auxiliary transmission mechanism 30 in view of the prevention of the belt slippage during the changeover upshift, so that the line pressure PL is increased (by the margin amount+the SEC pressure increase amount in the cooperative control). The changeover upshift of the auxiliary transmission mechanism 30 is performed along the preparation phase from time t3 to time t4, the torque phase from time t4 to time t5, the inertia phase from time t5 to time t6, the end phase from time t6 to time t7. During the time period from time t3 to time t7, which corresponds to the changeover upshift of the auxiliary transmission mechanism 30, (from time t3 to time t8), the SEC pressure command is increased. With this, the variator is downshifted, so that the cooperative control is performed so as to maintain the through transmission gear ratio of the automatic transmission 4 to the constant.

Then, at time t7, the changeover upshift of the auxiliary transmission mechanism 30 is finished. At time t8 after the time period by the delay timer is elapsed, the increase of the line pressure PL is finished. At time t9, the line pressure PL is returned to the value before the pressure increased.

Accordingly, in the oil vibration detection line pressure control when the belt load is the high load, as shown in FIG. 8, the decrease of the line pressure PL is started at time t2 as the oil vibration measure (the countermeasure). The pressure decrease of the line pressure is finished at time t3 from which the changeover upshift of the auxiliary transmission mechanism 30 is started. That is, the line pressure margin MIN oil vibration measure flag ON section is the line pressure decrease section as the oil vibration measure.

In this case, in case of either of the low load state (FIG. 7) and the high load state (FIG. 8), the line pressure PL is increased to be greater than the secondary pressure Psec. This is because the secondary pressure regulating valve 11c is constantly brought to the pressure regulating state. For example, when the line pressure PL is brought to the same pressure as the secondary pressure Psec, the secondary pressure regulating valve 11c is brought to the pressure regulation unable state. When the secondary pressure Psec is regulated by the decrease of the secondary pressure Psec and so on from this state, the spool is needed to be moved to the pressure regulation position. It is not possible to regulate the pressure during this movement of the spool. For preventing this situation, the line pressure PL is increased to be greater than the secondary pressure Psec. Besides, it is identical in the primary pressure Ppri (in a case where the primary pressure Ppri is greater than the secondary pressure Psec, the line pressure PL is set to be greater than the primary pressure PL).

[Oil Vibration Detection Line Pressure Characteristic Operation]

In the embodiment, when the oil vibration is generated in the actual hydraulic pressure of at least one of the primary pressure Ppri and the secondary pressure Psec, the line pressure PL is increased to be greater than the line pressure PL before the generation of the oil vibration. In a case where the auxiliary transmission mechanism 30 is shifted in this state where the line pressure PL is increased, the increase of the line pressure PL is continued until the shift of the auxiliary transmission mechanism 30 is finished.

In this case, the "oil vibration" is generated mainly due to the variation and so on of the damping elements of the valves in the hydraulic pressure control circuit 11. The increase control of the line pressure PL is to performed so as to suppress the oil vibration by setting to the pilot pressure which is the source pressure of the valve actuation signal pressure to the upper limit. Accordingly, the concrete amount of the increase amount of the line pressure PL is not important as long as that increase amount can suppress the oil vibration by setting the pilot pressure to the upper limit. "a case where the shift of the auxiliary transmission mechanism 30 is performed in a state where the line pressure PL is increased" is a case in which the driving point is moved across the shift line, and in which the shift command of the auxiliary transmission mechanism 30 is outputted. "finish the shift" is a timing at which the end phase is finished.

That is, the line pressure PL is in increased state until the shift of the auxiliary transmission mechanism 30 is finished. Accordingly, when the frictional engagement element in the disengagement state is engaged in the shift of the auxiliary transmission mechanism 30, it is possible to ensure the sufficient hydraulic pressure, and to perform the intended shift. The line pressure PL is sufficiently high. Accordingly, when the pressure supplied to the frictional engagement element is increased, it is possible to supply the intended hydraulic pressure without delay. Moreover, at the cooperative shift to shift the variator 20 in accordance with the shift of the auxiliary transmission mechanism 30, the hydraulic pressure to the variator 20 is needed in addition to the hydraulic pressure to the auxiliary transmission mechanism 30. Consequently, more hydraulic pressure is needed.

On the other hand, the line pressure PL is sufficiently high by the increase control of the line pressure PL. Accordingly, it is possible to sufficiently ensure the hydraulic pressures to the primary pulley 21 and the secondary pulley 22, and the hydraulic pressures to the low brake 32 and the high clutch 33, which are downstream of the line pressure PL. Consequently, it is possible to perform the intended cooperative shift. Besides, in a case where the intended cooperative shift cannot be performed, the unnatural feeling is provided to the driver due to the variation of the through transmission gear ratio by the unintended shift.

Moreover, it is conceivable to finish the increase and the decrease of the line pressure at the timing at which the oil vibration is converged. However, in this embodiment, the line pressure PL which is the source pressure of the parts (the frictional engagement element and the variator 20) that are shifted during the shift is not varied. Accordingly, it is possible to stabilize the shift. That is, in a case where the source pressure is varied, the pressure regulating position is varied so as to suppress the variation of the pressure supplied to the shift parts. At this variation of the pressure regulating position, the hydraulic pressure according to the command may not be obtained due to the response delay and so on. In this case, it is not possible to obtain the intended transmission gear ratio, so that the unnatural feeling may be provided to the driver.

Contrary to this, in this embodiment, the line pressure PL which is the source pressure is not varied during the shift of the auxiliary transmission mechanism 30. Accordingly, it is possible to dissolve the problem to provide the unnatural feeling to the driver due to the instability of the shift. Consequently, when the changeover shift of the auxiliary transmission mechanism 30 is interposed during the control of the increase of the line pressure for decreasing the oil vibration, it is possible to attain the intended cooperative shift by the stable shift characteristic.

In the embodiment, the secondary pressure Psec is increased to be greater than the hydraulic pressure before the cooperative shift during the cooperative shift according to the upshift of the auxiliary transmission mechanism 30. The line pressure control section (FIG. 4) is configured to finish the increase of the line pressure PL after the delay time period is elapsed from the timing of the end of the cooperative shift.

In this case, "during the cooperative shift" is from the timing when the shift command of the auxiliary transmission mechanism 30 is outputted (the timing when the driving point is moved across the shift line), to the end of the end phase of the auxiliary transmission mechanism 30. The "delay time period" is set to a time period after which the actual pressure of the decreased secondary pressure Psec becomes stable, that is, after which the secondary pressure Psec is converged to the decreased hydraulic pressure command. With this, even when the increase of the line pressure PL is finished so as to decrease the line pressure PL, the secondary pressure Psec is not undershot.

That is, the secondary pressure Psec is increased during the cooperative shift according to the upshift of the auxiliary transmission mechanism 30, so as not to generate the belt slippage due to the variation of the input torque to the variator according to the variation of the transmission gear ratio of the auxiliary transmission mechanism 30 (the shift of the variator 20 is controlled by the primary is pressure Ppri). The increased secondary pressure Psec is decreased at the timing of the end of the cooperative shift, that is, at the timing of the end of the shift of the auxiliary transmission mechanism 30, so as to prevent the unnecessary increase of the hydraulic pressure to deteriorate the fuel consumption. However, in a case where the secondary pressure Psec and the line pressure PL are simultaneously decreased at the timing of the end of the shift of the auxiliary transmission mechanism 30, the secondary pressure Psec may be undershot to generate the belt slippage. Accordingly, the timing of the decrease of the line pressure PL is retarded by the delay time period. With this, it is possible to suppress the undershooting of the secondary pressure Psec at the timing of the end of the shift of the auxiliary transmission mechanism 30, and to suppress the belt slippage.

In the embodiment, when the belt load is the low load, the control to continue the increase of the line pressure PL is performed until the shift of the auxiliary transmission mechanism 30 is finished.

That is, in case of the low load, the driving force such as the depression of the accelerator pedal may be requested hereafter. The hydraulic pressure is needed to be increased with respect to this request so as not to generate the slippage of the variator 20, the low brake 32, or the high clutch 33 with respect to the torque inputted from the engine 1 which is the traveling drive source. Moreover, the hydraulic pressure is needed to perform the shift to the transmission gear ratio corresponding to the request.

Contrary to this, the line pressure increase for decreasing the oil vibration is performed at the low load, so that it is advantageous to ensure the hydraulic pressure necessary with respect to the belt slippage, and the hydraulic pressure necessary for the shift. That is, in a case where the hydraulic pressure is increased based on the request of the driving force, there is a time lag for the increase of the hydraulic pressure so that it is not possible to satisfy the request during that period. On the other hand, in a case where the line pressure PL is increased when the belt load is the low load, the hydraulic pressure is increased before the request of the driving force. Accordingly, the time lag is decreased so that it is possible to satisfy the driving request.

In the embodiment, in a case where the oil vibration is generated when the belt load is not the low load, that is, when the belt load is the high load, the line pressure PL is decreased to be smaller than the line pressure before the generation of the oil vibration.

That is, when the belt load is not the low load, the line pressure PL is higher than a case where the belt load is the low load. Accordingly, the line pressure PL is sufficiently ensured. It is not necessary to further increase the line pressure with respect to the subsequent variation of the driving state.

Accordingly, when the belt load is not the low load, the line pressure PL is decreased to decrease the oil vibration, so that the line pressure PL is unnecessarily increased. With this, it is possible to suppress the deterioration of the fuel consumption.

Besides, in a case where the line pressure PL is decreased to correspond to the secondary pressure Psec like in the state of the single pressure regulation, it is possible to maximally decrease the line pressure PL, and thereby to improve the fuel economy. Moreover, in a case where the belt load is not the low load, the hydraulic pressure (the margin amount) is large. Accordingly, it is possible to increase the hydraulic pressure without delay with respect to the driving force request.

In the embodiment, in a case where the auxiliary transmission mechanism 30 is shifted in a state where the line pressure PL is decreased, the decrease of the line pressure PL is finished at the judgment of the shift of the auxiliary transmission mechanism 30, so that the line pressure PL is increased to the previous hydraulic pressure.

In this case, "at the judgment of the shift" is a timing at which the shift command of the auxiliary transmission mechanism 30 is outputted (the driving point is moved across the shift line).

That is, in the state where the line pressure is decreased, the line pressure PL is not sufficient for the shift of the auxiliary transmission mechanism 30 and the variator 20. Accordingly, when the shift of the auxiliary transmission mechanism 30, that is, the cooperative shift of the auxiliary transmission mechanism 30 is performed in the state where the line pressure PL is decreased, the decrease of the line pressure PL is finished at the judgment of the cooperative shift, so as to increase the line pressure PL. With this, at the cooperative shift, it is possible to suppress the deficiency of the hydraulic pressure in the auxiliary transmission mechanism 30 and the variator 20, and to perform the intended cooperative shift.

Besides, the oil vibration is decreased by varying the power transmitting path by the shift of the auxiliary transmission mechanism 30. Accordingly, there is no problem to finish the decrease of the line pressure PL.

Next, effects are explained.

In the hydraulic pressure control device for the continuously variable transmission of the vehicle according to the embodiment, it is possible to attain the following effects.

(1) A hydraulic pressure control device for a continuously variable transmission of a vehicle (engine vehicle continuously variable transmission) which includes a continuously variable transmission mechanism (variator 20) disposed between a traveling drive source (engine 1) and a driving wheel 7; a stepwise variable transmission mechanism (auxiliary transmission mechanism 30) which is disposed in series with the continuously variable transmission mechanism (variator 20), and which includes a plurality of frictional engagement elements (low brake 32 and high clutch 33); a shift control means (transmission controller 12) configured to shift the stepwise variable transmission mechanism (the auxiliary transmission to mechanism 30); a line pressure regulating valve 11a arranged to regulate a line pressure PL of the continuously variable transmission mechanism (variator 20) and the stepwise variable transmission mechanism (auxiliary transmission mechanism 30); a primary pressure regulating valve 11b arranged to regulate the primary pressure Ppri based on the line pressure PL; and a secondary pressure regulating valve 11c arranged to regulate the secondary pressure Psec based on the line pressure PL, the hydraulic pressure control device includes:

the shift control means (transmission controller 12) including a line pressure control section (FIG. 4) configured to increase the line pressure PL to be greater than the line pressure PL before a generation of an oil vibration when the oil vibration is generated in at least one of actual hydraulic pressures of the primary pressure Ppri and the secondary pressure Psec, and the line pressure control section (FIG. 4) being configured to continue the increase of the line pressure until the shift of the stepwise variable transmission mechanism (auxiliary transmission mechanism 30) is finished when the stepwise variable transmission (auxiliary transmission mechanism 30) is shifted in a state where the line pressure PL is increased.

Accordingly, when the shift is interposed during the line pressure increase control for decreasing the oil vibration, it is possible to attain the intended shift by the stable shift characteristic. Moreover, when the cooperative shift to shift the continuously variable transmission mechanism (the variator 20) in accordance with the shift of the stepwise variable transmission mechanism (the auxiliary transmission mechanism 30) is performed, the hydraulic pressure to the continuously variable transmission mechanism is needed in addition to the hydraulic pressure to the stepwise variable transmission mechanism. In this case, the line pressure in the pressure increased state until the shift of the stepwise variable transmission mechanism is finished. Consequently, it is possible to perform the intended cooperative shift. Moreover, the line pressure which is the source pressure for the parts (the frictional engagement elements and the continuously variable transmission mechanism) shifted during the shift is not varied until the shift is finished. Therefore, it is possible to stabilize the cooperative shift.

(2) When a cooperative shift to shift the continuously variable transmission mechanism (variator 20) in a direction opposite to the shift direction of the stepwise variable transmission mechanism (auxiliary transmission mechanism 30) in accordance with the upshift of the stepwise transmission mechanism (auxiliary transmission mechanism 30) is performed, the shift control means is configured to increase the secondary pressure Psec to be greater than the hydraulic pressure before the cooperative shift; and the line pressure control section (FIG. 4) is configured to finish the increase of the line pressure after a delay time period is elapsed from a timing of an end of the cooperative control (S8→S9).

Accordingly, the decrease timing of the line pressure PL is retarded. Consequently, in addition to the effect (1), it is possible to suppress the undershooting of the to secondary pressure Psec at the timing of the end of the shift of the stepwise variable transmission mechanism (the auxiliary transmission mechanism 30), and to suppress the belt slippage.

(3) The line pressure control section (FIG. 4) is configured to continue the increase of the line pressure PL until the shift of the stepwise transmission mechanism (the auxiliary transmission mechanism 30) is finished when a belt load is a low load (S5→S6).

Accordingly, in addition to the effects (1) and (2), it is advantageous to ensure the hydraulic pressure necessary with respect to the belt slippage, and the hydraulic pressure necessary for the shift, and to decrease the time lag with respect to the driving force request by the increase of the hydraulic pressure before the driving force request.

(4) The line pressure control section (FIG. 4) is configured to decrease the line pressure PL to be smaller than the line pressure PL before the generation of the oil vibration when the oil vibration is generated in a case where the belt load is not the low load (S2→S11).

Accordingly, in addition to the effect (3), the oil vibration is decreased by decreasing the line pressure PL when the belt load is not the low load. With this, the line pressure PL is unnecessarily increased. Moreover, it is possible to suppress the consumption of the driving energy. Besides, in case of the engine vehicle like the embodiment, it is possible to suppress the deterioration of the fuel economy.

(5) When the stepwise variable transmission (auxiliary transmission mechanism 30) is shifted in a state where the line pressure LP is decreased, the line pressure control section (FIG. 4) is configured to finish the decrease of the line pressure PL at a judgment of the shift of the stepwise variable transmission mechanism (auxiliary transmission mechanism 30) (S12→S13).

Accordingly, in addition to the effect (4), it is possible to suppress the deficiency of the hydraulic pressure of the stepwise transmission mechanism (the auxiliary transmission mechanism 30) and the continuously variable transmission mechanism (the variator 20) at the cooperative shift, and to perform the intended cooperative shift.

Hereinbefore, the control device of the continuously variable transmission mechanism for the vehicle according to the present invention is explained with reference to the embodiment. However, the concrete configurations are not limited to this embodiment. Variations and additions of the design are allowable as long as it is not deviated from the gist of the invention relating to the claims.

In the embodiment, the line pressure control section (FIG. 4) is configured to perform the line pressure increase control in a case where the oil vibration is generated at the traveling when the gear position of the auxiliary transmission mechanism 30 is the first speed. However, the line pressure control section does not perform to the line pressure increase control to decrease the oil vibration even when the oil vibration is generated in a case where the rotation difference is generated in the stepwise variable transmission mechanism (during the changeover shift). This is because it is possible to absorb the vibration according to the oil vibration by the switching of the power transmitting path by the changeover shift of the stepwise transmission mechanism so as not to perform the unnecessary increase and decrease of the line pressure.

In the embodiment, the stepwise variable transmission mechanism disposed in series with the continuously variable transmission is the auxiliary transmission mechanism 30 which has the two gear stages, and which is disposed at a position downstream of the variator 20. However, the stepwise variable transmission mechanism may be a transmission mechanism having a two or more gear stages. The stepwise variable transmission mechanism may be positioned at a position downstream or upstream of the continuously variable transmission mechanism.

In this embodiment, the control device for the continuously variable transmission mechanism of the vehicle according to the present invention is applied to the engine vehicle on which the continuously variable transmission with the auxiliary transmission is mounted. However, the control device according to the present invention is applicable to an electric vehicle provided with a motor generator which is a traveling drive source, and a hybrid vehicle provided with an engine and a motor generator which are traveling drive sources.

The invention claimed is:

1. A hydraulic pressure control device for a continuously variable transmission of a vehicle which includes a continuously variable transmission mechanism disposed between a traveling drive source and a driving wheel; a stepwise variable transmission mechanism which is disposed in series with the continuously variable transmission mechanism, and which includes a plurality of frictional engagement elements; a shift control section configured to shift the stepwise variable transmission mechanism; a line pressure regulating valve arranged to regulate a line pressure of the continuously variable transmission mechanism and the stepwise variable transmission mechanism; a primary pressure regulating valve arranged to regulate the primary pressure based on the line pressure; and a secondary pressure regulating valve arranged to regulate the secondary pressure based on the line pressure, the hydraulic pressure control device comprising:
the shift control section including a line pressure control section configured to increase the line pressure to be greater than the line pressure before a generation of an oil vibration when the oil vibration is generated in at least one of actual hydraulic pressures of the primary pressure and the secondary pressure, and
the line pressure control section being configured to continue the increase of the line pressure until the shift of the stepwise variable transmission mechanism is finished when the stepwise variable transmission is shifted in a state where the line pressure is increased,
wherein when a cooperative shift to shift the continuously variable transmission mechanism in a direction opposite to the shift direction of the stepwise variable transmission mechanism in accordance with the upshift of the stepwise transmission mechanism is performed, the shift control section is configured to increase the secondary pressure to be greater than the hydraulic pressure before the cooperative shift and the line pressure control section is configured to finish the increase of the line pressure after a delay time period is elapsed from a timing of an end of the cooperative control.

2. A hydraulic pressure control method for a continuously variable transmission of a vehicle which includes a continuously variable transmission mechanism disposed between a traveling drive source and a driving wheel; a stepwise variable transmission mechanism which is disposed in series with the continuously variable transmission mechanism, and which includes a plurality of frictional engagement elements; a shift control section configured to shift the stepwise variable transmission mechanism; a line pressure regulating valve arranged to regulate a line pressure of the continuously variable transmission mechanism and the stepwise variable transmission mechanism; a primary pressure regulating valve arranged to regulate the primary pressure based on the line pressure; and a secondary pressure regulating valve arranged to regulate the secondary pressure based on the line pressure, the hydraulic pressure control device comprising:
increasing the line pressure to be greater than the line pressure before a generation of an oil vibration when the oil vibration is generated in at least one of actual hydraulic pressures of the primary pressure and the secondary pressure; and
continuing the increase of the line pressure until the shift of the stepwise variable transmission mechanism is finished when the stepwise variable transmission is shifted in a state where the line pressure is increased,
increasing the secondary pressure to be greater than the hydraulic pressure before a cooperative shift when the cooperative shift to shift the continuously variable transmission mechanism in a direction opposite to the shift direction of the stepwise variable transmission mechanism in accordance with the upshift of the stepwise transmission mechanism is performed; and
finishing the increase of the line pressure after a delay time period is elapsed from a timing of an end of the cooperative control.

3. A hydraulic pressure control device for a continuously variable transmission of a vehicle which includes a continuously variable transmission mechanism disposed between a traveling drive source and a driving wheel; a stepwise variable transmission mechanism which is disposed in series with the continuously variable transmission mechanism, and which includes a plurality of frictional engagement elements; a shift control section configured to shift the stepwise variable transmission mechanism; a line pressure regulating valve arranged to regulate a line pressure of the continuously variable transmission mechanism and the stepwise variable transmission mechanism; a primary pressure regulating valve arranged to regulate the primary pressure based on the line pressure; and a secondary pressure regulating valve arranged to regulate the secondary pressure based on the line pressure, the hydraulic pressure control device comprising:
the shift control section including a line pressure control section configured to increase the line pressure to be greater than the line pressure before a generation of an oil vibration when the oil vibration is generated in at least one of actual hydraulic pressures of the primary pressure and the secondary pressure, and
the line pressure control section being configured to continue the increase of the line pressure until the shift of the stepwise variable transmission mechanism is finished when the stepwise variable transmission is shifted in a state where the line pressure is increased,
wherein the line pressure control section is configured to continue the increase of the line pressure until the shift of the stepwise transmission mechanism is finished when a belt load is a low load.

4. The hydraulic pressure control device for the continuously variable transmission of the vehicle as claimed in claim 3, wherein the line pressure control section is configured to decrease the line pressure to be smaller than the line pressure before the generation of the oil vibration when the oil vibration is generated in a case where the belt load is not the low load.

5. The hydraulic pressure control device for the continuously variable transmission of the vehicle as claimed in claim 4, wherein when the stepwise variable transmission is shifted in a state where the line pressure is decreased, the line pressure control section is configured to finish the decrease of the line pressure at a judgment of the shift of the stepwise variable transmission mechanism.

6. A hydraulic pressure control method for a continuously variable transmission of a vehicle which includes a continuously variable transmission mechanism disposed between a traveling drive source and a driving wheel; a stepwise variable transmission mechanism which is disposed in series with the continuously variable transmission mechanism, and which includes a plurality of frictional engagement elements; a shift control section configured to shift the stepwise variable transmission mechanism; a line pressure regulating valve arranged to regulate a line pressure of the continuously variable transmission mechanism and the stepwise variable transmission mechanism; a primary pressure regulating valve arranged to regulate the primary pressure based on the line pressure; and a secondary pressure regulating valve arranged to regulate the secondary pressure based on the line pressure, the hydraulic pressure control device comprising:

increasing the line pressure to be greater than the line pressure before a generation of an oil vibration when the oil vibration is generated in at least one of actual hydraulic pressures of the primary pressure and the secondary pressure; and continuing the increase of the line pressure until the shift of the stepwise variable transmission mechanism is finished when the stepwise variable transmission is shifted in a state where the line pressure is increased; and continuing the increase of the line pressure until the shift of the stepwise transmission mechanism is finished when a belt load is a low load.

* * * * *